Sept. 4, 1923.
F. GARCIA
AUTOMOBILE SIGNAL
Filed Sept. 14, 1922
1,466,935
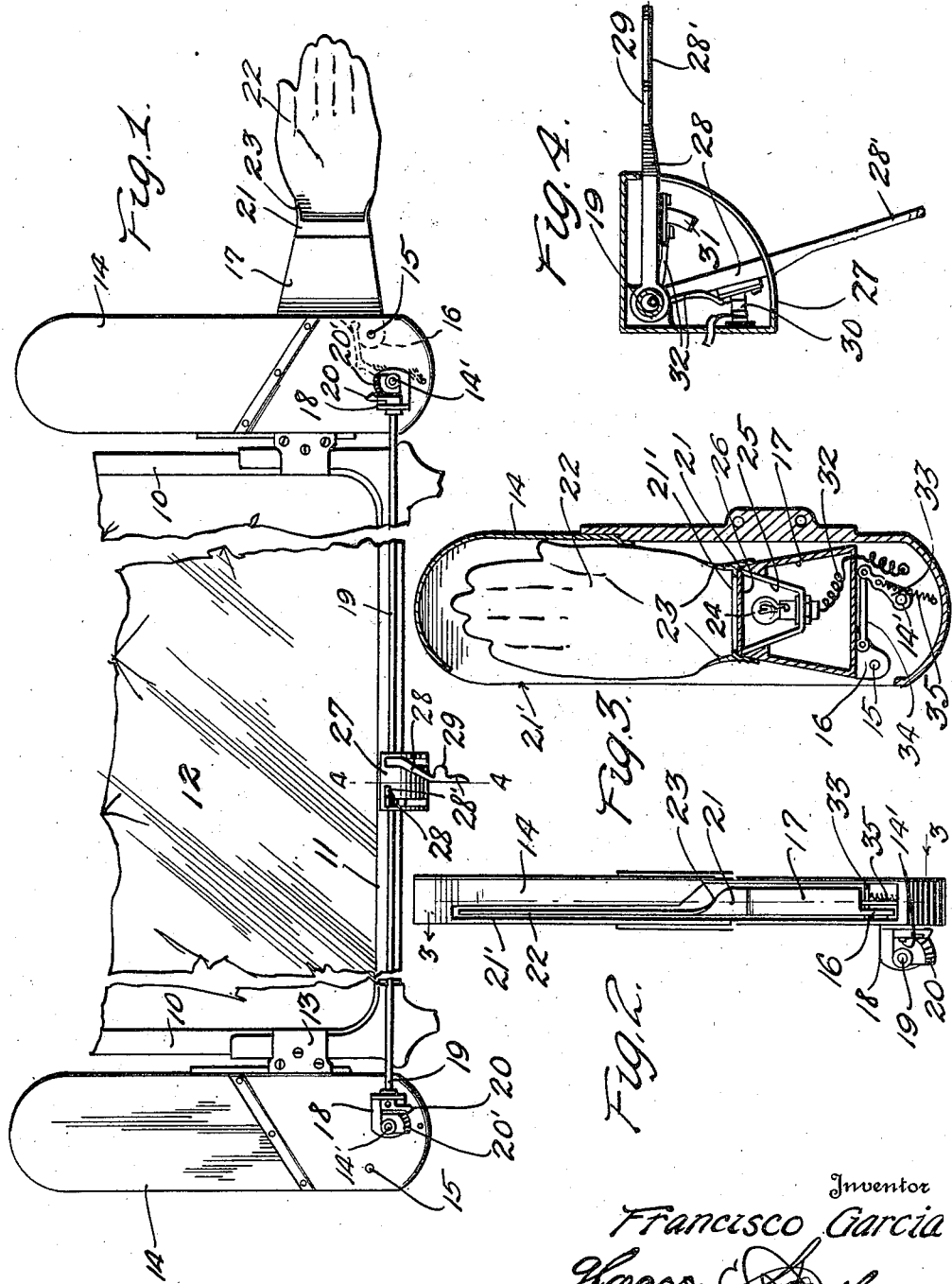
Inventor
Francisco Garcia
By
Attorney Patented Sept. 4, 1923.

1,466,935

UNITED STATES PATENT OFFICE.

FRANCISCO GARCIA, OF SAN ANTONIO, TEXAS.

AUTOMOBILE SIGNAL.

Application filed September 14, 1922. Serial No. 588,154.

*To all whom it may concern:*

Be it known that I, FRANCISCO GARCIA, a citizen of Mexico, residing at San Antonio, in the county of Bexar, State of Texas, have invented certain new and useful Improvements in Automobile Signals; and I do hereby declare the following to be a full, clear, and exact description of the invention, such as will enable others skilled in the art to which it appertains to make and use the same.

This invention relates to new and useful improvements in signals and particularly to signals for use on automobiles.

One object of the invention is to provide a novel and simple device of this character by means of which the driver may display, as an indication of change of direction, a signal means at either or both sides of the automobile.

Another object is to provide novel means whereby when one or both of the signals may be displayed, the same will be automatically illuminated.

Another object is to provide novel means for operating the signals which consists of a pair of handles formed to be grasped and operated individually or to be grasped and operated together.

Other objects and advantages will be apparent from the following description when taken in connection with the accompanying drawings.

In the drawings:

Figure 1 is an elevation of the signaling device as viewed from the driver's seat, one of the signal arms being in lowered position.

Figure 2 is a side elevation of the device.

Figure 3 is a vertical sectional view on the line 3—3 of Figure 2.

Figure 4 is a vertical transverse sectional view on the line 4—4 of Figure 1, showing the operating handle and the circuit closer.

Referring particularly to the accompanying drawings, 10 represents the sides, and 11 the lower transverse bars of the frame of the automobile windshield 12, in connection with which the present invention is particularly adapted for attachment.

Secured in embracing engagement with each of the side bars 10, and adjacent the lower bar 11, are the clamps 13, and detachably secured to each of the clamps is a vertically disposed and outwardly extending housing 14. As each side of the device is identical in construction, a description of one will suffice.

Extending rearwardly from the front wall of the housing or support 14, is a stud 15, with which is rotatably engaged the curved lug portion 16, of the lower end of the box 17, and whereby said box is adapted for pivotal movement laterally from the housing at the side of the automobile. Formed on and extending rearwardly from the rear wall of the support 14, is a bearing 18, and rotatably supported in this bearing is the shaft 19, which extends longitudinally of and parallel with the lower bar 11 of the windshield, and at right angles to the shaft 14' which is mounted in the lower portion of the housing 14 and extends into said bearing. This shaft 19 is of such length that its inner end is disposed adjacent the center of the said bar 11, of the windshield. On the outer end of the shaft is mounted a segmental gear 20, the same being a bevel gear which meshes with the gear 20' on the shaft 14', which latter gear is also a bevel gear. Secured in the outer end of the box 17 is an angular frame 21, and secured to this frame, and extending at right angles outwardly therefrom, is a signal device in the form of an open hand 22, the same being disposed to extend from the forward longer side of the opening 21', of the frame, and being braced to the ends thereof, as shown at 23. Within the box 17 is mounted an electric lamp 24, with the upwardly divergent reflecting plates 25, at the sides, and the sheet of glass 26, mounted within the opening 21', so that the light from the lamp may shine onto the palm of the hand 22, when the hand is lowered, as will be explained later herein.

Mounted on the intermediate portion of the transverse bar 11, of the windshield, is a small box 27, and rotatably supported in the opposite side walls of the box are the inner ends of the shafts 19, said ends being properly spaced apart within the box. Secured on the said inner end of each shaft 19, and projecting outwardly through the rear wall of the box, in position to be easily grasped by the driver, is a hand lever 28. The hand grip portions 28' of these levers being disposed in close proximity so that they may be grasped and moved together, and projecting from the outer side of each lever is a lug 29, which is adapted to be grasped when it is desired to move one lever without disturbing the other one. In the lower portion of the box 27 there are mounted the pairs of spring contact jaws 30, between which are received the fingers or blades 31, carried by the levers 28, when said levers are lowered. The lamps 24 have one side grounded on the automobile, and a wire 32 leading from the other side to the finger or blade 31, of a lever 28, whereby when the lever is depressed, to rock the shaft 19, the finger or blade 31 will pass into contact with a pair of blades or jaws 30, to complete a circuit and light a lamp 24, the light from which will shine onto the palm of the hand, rendering the same clearly visible from the rear by others.

It will be noted that the shafts 19 are hollow so that the wires 32 may be led therethrough, from the lamps to the jaws 30.

On the other end of the shaft 14' is a radially extending arm 33, and pivotally connecting this arm with the lug portion 16 is a link 34, whereby when the shaft 19 is rocked in one direction the gears 20 and 20' will cause the movement of the link and the swinging of the signal hand into horizontal extended position. Rocking of the shaft in the opposite direction causes the hand to be elevated into the housing 14. When the lever 28 is moved downwardly to rock the shaft 19, the blade 31 will engage between the adjacent pair of jaws 30, thus closing a circuit and lighting the lamp which illuminates the appropriate hand, so that drivers approaching from the rear may readily see the hand, and appreciate its signal intent.

By depressing either of the handles 28 a hand will be lowered into indicating position, and this is accomplished by grasping one of the laterally projecting lugs 29. When, however, it is desired to lower both hands at the same time, both of the hand grips 28' are grasped, and the two levers depressed. This latter movement causes both of the shafts 19 to be rocked, as will be readily understood.

Connected to the lower portion of the housing 14, and to the radial arm 33, is a coil spring 35, which serves to assist the signal hand and box 17 in maintaining its elevated or lowered positions without the annoyance of the parts rattling or chattering, as the automobile moves over rough streets or roads.

What is claimed is:

1. In an actuator a pair of movable members, longitudinally alined shafts operatively connected with the movable members at their outer ends, the inner ends of the shafts being spaced, a casing supporting the inner ends of the shafts and having slots, and a lever fixed on the inner end of each shaft and projecting through a slot in position to be operated independently or together.

2. In an actuator a pair of pivoted members, longitudinally alined shafts operatively engaged at their outer ends with the pivoted members and having their inner ends spaced, a casing enclosing and supporting the inner ends of the shafts and having parallel slots, an operating arm fixed on the inner end of each shaft and movable through a slot, said operating arms being closely arranged for simultaneous movement by the hand of the operator, and each arm having a lateral finger for the operator to move the arms independently.

In testimony whereof, I affix my signature, in the presence of two witnesses.

FRANCISCO GARCIA.

Witnesses:
 ANDRES TREVINO,
 CARLOS VALDO.